United States Patent [19]

Lai

[11] 4,145,806
[45] Mar. 27, 1979

[54] METHOD OF ASSEMBLING AN ELECTROCHEMICAL CELL

[75] Inventor: San-Cheng Lai, Westlake Village, Calif.

[73] Assignee: Rockwell International Corporation, El Segundo, Calif.

[21] Appl. No.: 825,347

[22] Filed: Aug. 17, 1977

[51] Int. Cl.$^2$ .............................................. H01M 4/08
[52] U.S. Cl. .................................. 29/623.1; 429/207; 429/223; 429/221
[58] Field of Search ................ 29/623.1; 429/207, 223, 429/221

[56] References Cited

U.S. PATENT DOCUMENTS

| 3,501,349 | 3/1970 | Benak | 29/623.1 |
|---|---|---|---|
| 3,907,589 | 9/1975 | Gay et al. | 429/221 |
| 4,006,034 | 2/1977 | Shimotake et al. | 429/221 |
| 4,011,373 | 3/1977 | Kaun et al. | 429/221 |

*Primary Examiner*—Lowell A. Larson
*Attorney, Agent, or Firm*—L. Lee Humphries; Henry Kolin; Clark E. DeLarvin

[57] ABSTRACT

A method of assembling a lithium alloy/molten salt/metal chalocogenide, high-energy density electrochemical device. Broadly, the method comprises providing a negative electrode structure in intimate contact with an electrolyte, which is conductive at elevated temperatures. There also is provided in contact with the electrolyte a positive electrode structure which includes a current-collecting substrate containing a sulfur and oxygen compound of at least one alkali metal in intimate admixture with a particulate metal. An electric current is passed from one electrode to the other to cause such device to be in a desired state of elecrochemical charge, whereby when said device is in a charged state a negative electrode active material comprises an alkali metal alloy and the positive electrode active material comprises a mixture of oxides and sulfides of the particulate metal.

9 Claims, 2 Drawing Figures

METHOD OF ASSEMBLING AN ELECTROCHEMICAL CELL

BACKGROUND OF THE INVENTION

1. Field of the Invention

The invention broadly relates to electrical energy storage devices and more particularly to lithium electrode containing secondary electrochemical cell, wherein the cell can be assembled with the negative electrode in an initially partially discharged state.

2. Prior Art

Two approaches generally have been followed in the construction of a lithium electrode for use in an electrical energy storage device, such as a rechargeable battery, particularly one employing a molten salt electrolyte. In one approach, the lithium is alloyed with another metal such as, for example, aluminum to form a solid electrode at the operating temperature of the cell. In the other approach, liquid lithium is retained in a foraminous metal substrate by capillary action. Heretofore, the latter approach has been preferred because it offers higher operating cell voltages and therefore potentially higher battery energy densities. Certain problems are encountered, however, when it is attempted to retain molten lithium in a foraminous metal substrate. More particularly, most metals which are readily wetted by lithium are too soluble in the lithium to permit their use as the metal substrate, whereas most metals structurally resistant to attack by molten lithium are poorly wetted by the lithium when placed in a molten salt electrolyte.

It has been suggested that metals structurally resistant to attack by molten lithium may be wetted by immersion in molten lithium maintained at a high temperature. However, the structure so wetted by lithium at these higher temperatures usually undergoes progressive dewetting when used as the negative electrode in a secondary battery containing a molten salt electrolyte maintained at the substantially lower temperatures at which such a battery operates. Thus, after operation of the battery for a number of cycles, it has been found that lithium no longer preferentially wets the substrate, the electrode progressively losing capacity. Various methods have been proposed in an attempt to overcome this problem. See, for example, U.S. Pat. Nos. 3,409,465 and 3,634,144. None of the proposed methods have proven entirely satisfactory.

The use of a solid lithium alloy as taught by the prior art also is not without problems. More particularly, lithium-aluminum alloy, for example, is approximately 300 millivolts more positive than liquid lithium. Thus, electrochemical cells utilizing lithium-aluminum alloys as electrodes are not able to achieve the same potentials as those utilizing liquid lithium electrodes. Further, in a molten salt electrolyte, the lithium-aluminum alloy electrode expands and contracts greatly during charging and discharging of the electrochemical cell. Thus, it has been reported that the lithium-aluminum electrode may change in volume by as much as 200% during charging and discharging of the cell. Still further, lithium-aluminum alloys generally are limited to a lithium content of less than about 30 wt.%.

Various other materials have been suggested for use as an alloy with lithium to form a solid electrode. In U.S. Pat. No. 3,506,490, for example, it is suggested that the lithium be alloyed with either aluminum, indium, tin, lead, silver, or copper. However, none of these materials have been proven to be completely satisfactory. More particularly, these other suggested materials, such as tin and lead, for example, form alloys containing lesser amounts of lithium than does aluminum, and thus have a still lower capacity (ampere-hours) per unit weight of alloy. Further, the potential of these other alloys compared with liquid lithium is more positive than that of a lithium-aluminum alloy; thus, alloys of such other materials are less desirable. Other patents relating to solid lithium anodes include U.S. Pat. Nos. 3,506,492 and 3,508,967.

As a means of resolving some of the foregoing problems, U.S. Pat. No. 3,969,139 provides an electrode structure utilizing an alloy of lithium and silicon, this electrode being of particular utility as the negative electrode in a rechargeable lithium-metal sulfide molten salt cell. Such an electrode provides excellent lithium retention, significantly reduces corrosion, and provides twice the energy capacity of the lithium-aluminum electrode.

However, it was subsequently found that in electrochemically forming the lithium-silicon alloy electrode, not all the silicon was utilizable in the electrochemical forming process, thereby requiring a greater amount of silicon for a given ampere-hour capacity. Also, when utilized at high current densities, the lithium-silicon alloy electrode tended to become polarized during electrochemical transfer of lithium into and out of the electrode.

U.S. patent application Ser. No. 715,358 filed Aug. 18, 1976 and assigned to the Assignee of the present invention, suggests that the foregoing problems are substantially overcome through the use of a ternary alloy of lithium, silicon and iron. The use of a lithium-silicon iron alloy permits substantially complete utilization of the silicon and further reduces the tendency of the electrode to polarize at high current densities. However, another problem has been found with the use of lithium-silicon alloys which is not overcome by the addition thereto of iron. Specifically, it has been found that during cycling of a lithium-silicon electrode that the silicon tends to migrate into the metal substrate supporting structure causing the metal to become brittle, lose its structural integrity and gradually disintegrate into small particles.

More recently, in U.S. patent application 793,815 filed May 5, 1977, and also assigned to the Assignee of the present invention, it is suggested that the foregoing problems are substantially overcome by utilizing an improved lithium electrode, which comprises a ternary alloy of lithium, silicon, and boron in intimate contact with the supporting current-collecting matrix.

Another problem encountered with electrochemical cells of the lithium-metal chalcogenide type is that lithium is highly reactive and is easily contaminated by combination with moisture, oxygen, or nitrogen within air. Consequently, in assembling such cells the lithium or lithium alloys are ordinarily handled in a dry inert gas such as a helium environment in the preparation of the electrodes and in the assembly of the electrochemical cells. In addition, glove-box type facilities are employed to provide an appropriate inert atmosphere and to insure the safety of the workers.

U.S. Pat. No. 3,947,291 suggests assembly of a secondary electrochemical cell in a completely discharged state. The assembled cell includes a positive electrode separated from a negative electrode by a molten salt electrolyte. The positive electrode includes a metallic mesh impregnated with an intimate mixture of lithium sulfide and the electrolyte. The cell is electrochemically charged to form iron sulfide within the positive electrode, and a lithium alloy (lithium-aluminum) within the negative electrode. A disadvantage of this method is the high cost of lithium sulfide and the difficulties associated with its handling. Thus, there still is need for a more economical way of assembling such an electrochemical cell.

SUMMARY OF THE INVENTION

Broadly, the present invention provides a method of assembling a high energy density electrochemical device, wherein the negative electrode structure initially is in a partially discharged state. The method comprises providing a negative electrode structure, which includes a first metal, preferably selected from the group consisting of silicon and aluminum, which forms an alloy with a desired electronegative active material. The electronegative active material is an alkali metal and perferably is lithium. A body of electrolyte is provided in contact with the negative electrode structure. The electrolyte comprises at least one alkali metal salt, which is conductive at elevated temperatures, and wherein the alkali metal corresponds to the selected electronegative active material. There also is provided a positive electrode structure in the electrolyte and spaced from the negative electrode structure. The positive electrode structure includes a current-collecting substrate containing a sulfur and oxygen compound of at least one alkali metal in intimate admixture with a particulate second metal; the second metal preferably being one or more of iron, copper, and nickel. An electric current is passed from one electrode to the other to cause said device to be in a desired state of electrochemical charge. Preferably, the electric current is cycled to cause the device to be first in a discharged state and subsequently in a fully charged state. When said device is in a charged state, the negative electrode material comprises an alkali metal alloy, and the positive electrode material comprises a mixture of oxides and sulfides of the second metal.

DESCRIPTION OF A PREFERRED EMBODIMENT

Figure 1:
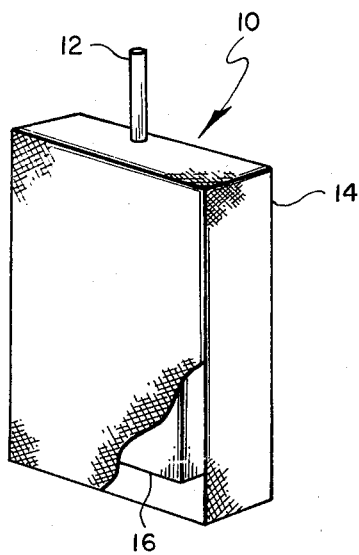
FIG. 1 is a pictorial view in perspective of an electrode of the present invention.

In accordance with the present invention there is provided a method of assembling a high-energy density electrochemical device such as a lithium alloy molten salt/metal chalcogenide battery. The present invention provides a method of assembling such devices wherein the negative electrode structure may be in a partially discharged state, thus, facilitating the ease of handling the assembly and a more economical active material for the positive electrode.

The negative electrode in its broadest aspect comprises an alloy of an alkali metal and another metal in intimate contact with the supporting current-collecting matrix when the negative electrode is in a fully charged state. The term "alloy" as used herein is defined as an intimate mixture of two or more metals in which the metals may form mixed crystals, solid solutions or chemical compounds. The metals also may be present in more than one of these states of the same alloy. The particularly preferred materials for forming an alloy with the alkali metal are aluminum and silicon, silicon being preferred. The applicable alkali metals may be either lithium, potassium or sodium, however, lithium is the particularly preferred alkali metal. The electrode contains enough active material or alkali metal to provide about 80% of the ultimately desired capacity.

For certain applications, depending on the temperature of use and the nature of the electrolyte with which the electrode will be in contact, the electrode may be self-supporting. However, for most applications, particularly where a lithium alloy electrode is in contact with a molten salt electrolyte at elevated temperatures, the electrode structure further includes a supporting current-collecting matrix in intimate contact with the alloy.

Suitable materials for the supporting current-collecting matrix are those materials resistant to attack by an alkali metal such as lithium. Examples of such materials include iron, steel, stainless steel, molybdenum, titanium, tantalum, and zirconium. The purpose of providing a matrix in intimate contact with the alloy is to provide for substantially uniform current density throughout the alloy and also to provide structural support for the alloy. It has been found that the lithium alloys, for example, generally lack structural integrity when used in an electrical energy storage device as the sole component of the negative electrode, particularly in a molten salt electrolyte at its high operating temperature. To function for any significant length of time without disintegration, therefore, it is preferable if not actually essential that the lithium alloy be provided with a supporting matrix. It is contemplated and preferred, within the scope of this invention, that the support and current-collecting capability be provided by a single structure; however, the support may be provided by one structure and the current-collecting capability by another separate structure.

The matrix may be in the form of an electronically conductive porous substrate having an apparent density of from about 10 to 30 percent of that of the base material. Advantageously, the substrate will have a median pore size within the range of from about 20 to 500 microns and preferably from about 50 to 200 microns. A preferred form of such a substrate is formed from woven or non-woven wires pressed together to a desired apparent density and then sintered. Such pressed and sintered wire structures are known and commercially available as Feltmetals. The porous substrate then is impregnated with the alloying constituent such as particulate aluminum or silicon.

In another variation, the matrix structure may be in the form of a perforate container formed from wire screen or the like, and containing therein a body of the alloying constituent. Alternatively, the alloying constituent is in intimate contact with a porous substrate enclosed in the perforate container, it being desirable that the container and the substrate be in electrical contact with one another. This latter variation is particularly useful when the porous substrate is formed from very fine woven or non-woven wires pressed together to form a body.

It has been found, at least in the case of iron used as the substrate material, that if the wire used to form the porous substrate has a diameter of less than about 10 microns, the substrate tends to break up and disintegrate upon repeated charging and discharging of the electrode in a molten salt electrolyte. Such destruction is the result of imperceptible expansion and contraction of the electrode and the occurrence of a chemical interaction. In selecting material for use as a substrate, therefore, consideration should be given to any chemical reaction or corrosion that may occur as a result of the specific electrolyte or matrix material which is utilized. Further, if the matrix comprises woven or non-woven wires pressed together to provide a porous substrate, the wire should have a diameter of at least about 10 microns. Advantageously, the wire diameter will be from about 10 to about 500 microns and preferably from about 10 to 200 microns.

A particularly suitable supporting current-collecting matrix electrode structure that may be utilized in the present invention is shown in U.S. Pat. No. 4,003,753, assigned to the Assignee of the present invention, said patent being hereby incorporated by reference. Broadly, this matrix structure comprises a unitary multi-cell structure including a plurality of wall members having edges and axially extending surfaces which form a plurality of cells having at least one open end, said cells having a cross-sectional area of at least about 0.04 cm$^2$. The edges of the wall members in the open end of the cells are aligned in a common plane to form a planar face. Generally, the electrode structure will have a planar face having a surface area of from about 25 to 300 cm$^2$. The axially extending surfaces of the wall members are substantially perpendicular to the planar face. The body of electrochemically active alloy material is disposed in the cells, being retained in place by an electrolyte-permeable member which is affixed to the wall members and covers the open end of the cells. This type of matrix electrode structure may also be utilized for containing a body of electrochemically active positive electrode material.

The multi-cell matrix structure is essentially a macroporous or open-faced cellular structure. The individual cells may take various forms, however, such as squares, diamond shapes, rectangular, circular, octagonal, or indeed just about any geometric shape. Further, the individual cells may or may not share a common wall. The particularly preferred form is one in which the individual cells are hexagonal in shape, sharing a common wall to form a honeycomb structure. This preferred shape optimizes the void volume for retention of active material while at the same time providing a high strength-to-weight ratio. In some instances, however, other less complex forms such as square-shaped cells may be preferred for economic reasons. An advantage of this matrix structure over the prior art porous matrix structures is the ease with which it can be uniformly loaded with active materials.

The cell depth of the multi-cell structure is not particularly critical. Generally it has been found that good utilization of the electrochemically active positive or negative electrode material is attainable with cells having a depth of from about 0.1 to 1.0 cm and preferably from about 0.5 to 1.0 cm. It will be appreciated, however, that the depth of the cell and thickness of the wall members of the multi-cell structure should be such as to provide structural integrity and resist warping. Particularly good results have been obtained with respect to effective utilization of active material and structural integrity when the ratio of the open cross-sectional area of the cell to the depth of the cell is maintained within a range of from about 1:1 to 2:1, and the wall members of the cell have a thickness within the range of from about 0.002 to 0.05 cm, preferably from about 0.002 to about 0.02 cm.

The particular material selected for the electrode structure of the present invention is not critical except insofar as it must be one which is not attacked or corroded by the molten electrolyte during normal operation of the device. Generally, iron, steel, or nickel steel alloys are preferred on the basis of cost for containing the lithium alloys. Molybdenum, titanium, and tantalum are preferred on the basis of their corrosion resistance, however, the cost of these metals are generally prohibitive.

The electrolyte-permeable member may be conductive or non-conductive and fills two functions: (1) to permit free passage of charged ions and electrolyte into and out of the cells, and (2) to retain the active material in the cell. It has been found that the structural integrity of this matrix electrode structure is greatly enhanced when the electrolyte-permeable member is fixedly attached to the wall members, preferably at the edges of the wall members, for example, by welding, brazing, or diffusion bonding.

In a particularly preferred embodiment, the electrolyte-permeable member is formed from a wire screen wherein the individual wires have a diameter of from about 0.002 to 0.02 cm. The opening in the electrolyte-permeable member should have a cross-sectional area within the range of from about $1 \times 10^{-6}$ to $1 \times 10^{-3}$ cm$^2$, and there should be provided from about $10^5$ to $10^2$ openings per square centimeter. The electrolyte-permeable member preferably is made from the same material as the wall members. In addition to screens, other forms which may be used are porous sintered plaques, perforate plates, and the like. While the wire screen is applicable to both positive and negative electrode structures because of its low cost, these other forms also may be used. When a porous plaque such as porous nickel, iron or the like is used, it should have an apparent density of from about 20 to 60% of that of the base metal and an average pore size of from about 1 to 20 microns.

The negative electrode structure also may include additives such as boron or iron to enhance the electrode performance or reduce the tendency of silicon to migrate into the current-collecting and supporting substrate.

The electrolyte utilized preferably is a lithium-ion containing molten salt electrolyte; alternatively, for certain particular cell systems, a solid electrolyte, an organic solvent electrolyte or an aqueous electrolyte is utilizable.

The term "molten salt electrolyte" as used herein refers to a lithium halide-containing salt which is maintained at a temperature above its melting point during operation of the electrical energy storage device. The molten salt may be either a single lithium halide, a mixture of lithium halides, or a eutectic mixture of one or more lithium halides and other alkali metal or alkaline earth metal halides.

Typical examples of binary eutectic salts are lithium chloride-potassium chloride, lithium chloride-magnesium chloride, lithium chloride-sodium chloride, lithium bromide-potassium bromide, lithium fluoride-rubidium fluoride, lithium iodide-potassium iodide, and mixtures thereof. Two preferred binary salt eutectic mixtures are those of lithium chloride and potassium chloride (melting point 352° C.), and lithium bromide and rubidium bromide (melting point 278° C.).

Examples of ternary eutectics useful as the molten salt electrolyte include calcium chloride-lithium chloride-potassium chloride, lithium chloride-potassium chloride-barium chloride, calcium chloride-lithium chloride-barium chloride, and lithium bromide-barium bromide-lithium chloride. Preferred ternary eutectic mixtures include those containing lithium-chloride, lithium fluoride and lithium iodide (melting point 341° C.) and lithium chloride, lithium iodide and potassium iodide (melting point 260° C.).

The suitable alkali or alkaline earth metal ion should have a deposition potential very close to or preferably exceeding deposition potentials of lithium ion in the electrolyte. Lithium halide salts can be readily combined with halides of potassium, barium, and strontium. Halides of metals such as cesium, rubidium, calcium, or sodium may be used, but a substantial proportion of these metals may be co-deposited with the lithium when the electrode is charged, with a resulting small loss in potential.

Although the ternary eutectic salt mixtures, particularly those containing the iodides, provide lower melting points, the binary eutectic mixture of lithium chloride-potassium chloride sometimes is preferred on the basis of its lower cost and availability, particularly for batteries to be used in large scale applications such as electric powered vehicles and electric utility bulk energy storage.

The positive electrode or cathode is an electron acceptor (when in a charged state) and contains an active material which is electropositive with respect to the selected electronegative alkali metal material in the negative electrode. In accordance with the present invention, a sulfur and oxygen-containing compound of an alkali metal is impregnated into the cathode supporting structure. Suitable sulfur and oxygen compounds of an alkali metal are the sulfites, sulfates and thiosulfates of the selected alkali metal. The preferred compounds are the thiosulfates of sodium, potassium and lithium. For example, when sodium thiosulfate is utilized with a lithium alloy negative electrode, an electric current is passed between the two electrodes to fully discharge the electrode and produce a mixture of oxides and sulfides of lithium and sodium in the positive electrode. The polarity is then reversed causing the lithium in the positive electrode and some of the lithium in the electrolyte to flow into the negative electrode, the sodium ions going into the electrolyte and replacing the lithium ions which are charged into the negative electrode. The oxygen and sulfur constituent of the thiosulfate reacts with a particulate metal in the positive electrode to form oxides and sulfides of such metal. Sodium thiosulfate is particularly preferred in view of its availability and substantially lower cost. When a sulfur and oxygen compound of sodium is used, however, it tends to raise the melting temperature of the electrolyte. Therefore, in some instances potassium compounds may be preferred.

Suitable metals are the transition metals and the particularly preferred particulate metals for use in the positive electrode structure are iron, nickel, copper and mixtures thereof. Particularly good results are obtained using iron. Thus, the present invention provides a novel way of forming a positive electrode comprising a transition metal chalcogenide such as those disclosed in U.S. Pat. No. 3,898,096.

Referring now to FIG. 1, a typical electrode structure 10 utilized in accordance with the present method is shown. The electrode 10, which may be either a positive or negative electrode, includes a current-collecting wire 12 and an active retaining material member 14, which may be in the form of a wire cage, porous plaque or wire screen. The electrode structure further includes a porous substrate impregnated with active material 16. Alternatively, the electrode substrate may be an open "honeycomb" type of structure.

Figure 2:
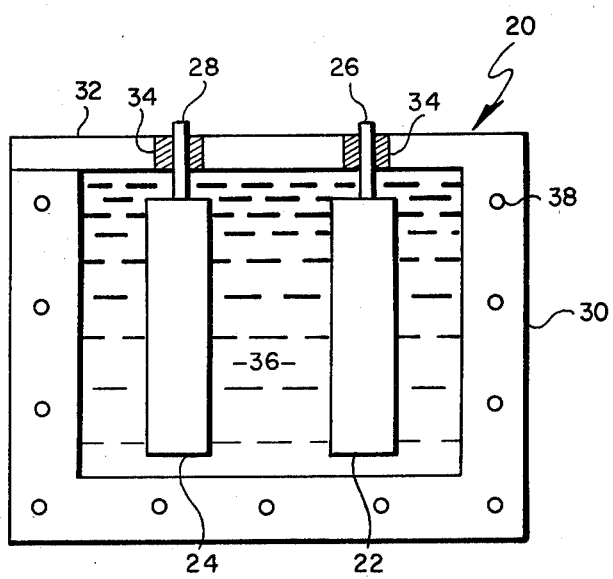
FIG. 2 is a diagrammatic representation of an electrical energy storage device of the present invention.

In FIG. 2 there is depicted an electrical energy storage device 20 assembled in accordance with the method of the present invention. The storage device 20 includes a positive electrode 22 and a negative electrode 24. Electrodes 22 and 24 are provided with electrical connectors 26 and 28, respectively. The electrical energy storage device also includes a housing 30 and a cover 32. The cover 32 is provided with aperatures therethrough for electrical connectors 26 and 28. Located within the aperatures are electrically non-conductive insulators 34. The electrical energy storage device also includes electrolyte 36, which is a molten salt conductive at the operating temperature of the device. Housing 30 also may be provided with a heating means such as a plurality of electrical resistance heaters 38 to maintain the device at the desired operating temperature.

The following examples are set forth for the purpose of illustrating the present invention in greater detail, but are not to be considered as limitations thereof. Thus, the examples principally relate to use of sodium thiosulfate in the positive electrode initially and silicon in the initially partially discharged negative electrode which is preferred. However, the invention should not be construed as limited to those specific materials, for, as herein disclosed, other materials will also have utility in an electrical energy storage device utilizing a molten salt electrolyte.

EXAMPLE 1

A series of tests were performed to demonstrate the method of the present invention wherein it is possible to assemble a high energy density electrochemical device with a negative electrode in a partially discharged (80% charged) state. The negative electrode structure comprised a honeycomb containing a lithium-iron silicide. The electrolyte was a eutectic mixture of lithium chloridepotassium chloride. The positive electrode comprised a honeycomb structure containing a mixture of metal powder and various sulfates. Specifically, the materials tested were Fe and $Li_2SO_4$, Fe and $Na_2S_2O_3$, Cu and $Li_2SO_4$, Cu and $Na_2S_2O_3$, and Ni and $Na_2S_2O_3$. In each test an electric current was passed from one electrode through the electrolyte to the other to first discharge the electrodes and then the current flow was reversed to form in the charged state an electrichemical device wherein the active material in the negative electrode was a lithium-ferrosilicon alloy and in the positive electrode a mixture of oxides and sulfides of the selected metal. Of the materials tested the iron powder and thiosulfate gave the best results with high utilization (about 80%) and high coulombic efficiency (about 98%). The other materials were satisfactory but not as good as the iron-thiosulfate combination. Thus, this example demonstrates the efficacy and utility of the method of the present invention.

EXAMPLE 2

The following example demonstrates the application of the method of the present invention to prepare a high energy density electrochemical device and the subsequent testing and cycling of such device. A positive electrode was prepared from steel honeycomb measuring 2 in. × 2 in. × 3/16 in. depth. The honeycomb was loaded with 4.53 gm of a mixture of particulate iron and sodiumthiosulfate in a weight ratio of 2:1. The honeycomb then was covered with a wire cloth. The theoretical capacity, based on $Na_2S_2O_3$ was 11.9 amp-hr (0.96 ah/cm$^3$). A similar negative electrode structure was filled with 10.4 gm of $Li_8FeSi_2$ powder and covered with a wire cloth. The theoretical capacity of the negative electrode was 13.5 amp-hr (based on a fully charged $Li_{10}FeSi_2$ electrode). Both electrodes were then discharged at a slow rate (about 10 ma/cm$^2$) in a lithium-chloride potassium-chloride eutectic salt maintained at a temperature of about 450° C. The cell was cycled over 30 cycles during a four-week period. The results are shown below:

| Current Density (ma/cm$^2$) | Utilization (%) | Coulombic Efficiency (%) | Voltage Efficiency (%) |
| --- | --- | --- | --- |
| 20 | 97 | 98 | 72.7 |
| 30 | 91 | 98 | 70.6 |
| 40 | 83 | 95 | 67.7 |

From the foregoing results it is seen that the utilization is exceptionally good, thus demonstrating the utility of the present method to assemble a high energy density electrochemical device with an initially partially discharged negative electrode.

From the foregoing examples it is seen that the method of the present invention provides a way of assembling a high energy density storage device, wherein the negative electrode may be in a partially discharged state. In addition, the proposed method is advantageous over that disclosed in U.S. Pat. No. 3,947,291, in that the disclosed sulfates and thiosulfates are much less expensive than lithium sulfide. In addition, the alkali metal sulfates and thiosulfates present fewer problems during fabrication of the electrode and assembly of the device.

It will, of course, be realized that various modifications can be made in the method of practicing the present invention without departing from the spirit thereof. Thus, while the invention has been illustrated and described with respect to certain exemplary embodiments relating to particular preferred constructions and materials for the electrode structures, and while preferred embodiments of secondary cells utilizing molten salt electrolytes and metal sulfide-oxide cathodes have been illustrated, it should be understood that within the scope of the appended claims the invention may be practiced otherwise than as specifically illustrated and described.

What is claimed is:

1. A method of assembling a high energy density electrochemical device comprising:
   (a) providing a negative electrode structure including a first metal which forms an alloy with an electronegative active material selected from the group consisting of alkali metals;
   (b) providing a body of electrolyte in contact with said negative electrode structure, said electrolyte comprising at least one alkali metal salt which is conductive at elevated temperatures, and wherein the alkali metal corresponds to the selected electronegative active material;
   (c) providing a positive electrode structure in said electrolyte and spaced from said negative electrode structure, said positive electrode structure including a current-collecting substrate containing a sulfur and oxygen compound of at least one alkali metal in intimate admixture with a particulate second metal; and
   (d) passing an electric current from one electrode to the other to cause said device to be in a desired state of electrochemical charge whereby when said device is in a charged state the negative electrode active material comprises an alkali metal alloy and the positive electrode active material comprises a mixture of oxides and sulfides of said second metal.

2. The method of claim 1 wherein said electronegative active material is lithium.

3. The method of claim 2 wherein said electrolyte comprises a mixture of a lithium halide and at least one other alkali metal halide.

4. The method of claim 1 wherein said particulate second metal is selected from the group consisting of iron, copper, nickel and combinations thereof.

5. The method of claim 1 wherein said first metal is selected from the group consisting of silicon and aluminum.

6. The method of claim 1 wherein said sulfur and oxygen compound of at least one alkali metal is selected from the group consisting of $Na_2S_2O_3$, $Li_2S_2O_3$ and $K_2S_2O_3$.

7. The method of claim 3 wherein said particulate second metal is selected from the group consisting of iron, copper nickel and combinations thereof.

8. The method of claim 7 wherein said first metal is selected from the group consisting of silicon and aluminum.

9. The method of claim 6 wherein said electrolyte comprises a mixture of a lithium halide and at least one other alkali metal halide.

* * * * *